United States Patent
Jones

(10) Patent No.: US 7,562,847 B2
(45) Date of Patent: Jul. 21, 2009

(54) AUTONOMOUS IN-FLIGHT REFUELING SYSTEM

(75) Inventor: Philip E. Jones, Naples, FL (US)

(73) Assignee: Parker-Hannifin Corporation, Cleveland, OH (US)

(*) Notice: Subject to any disclaimer, the term of this patent is extended or adjusted under 35 U.S.C. 154(b) by 568 days.

(21) Appl. No.: 11/180,438

(22) Filed: Jul. 12, 2005

(65) Prior Publication Data
US 2006/0208132 A1    Sep. 21, 2006

Related U.S. Application Data

(60) Provisional application No. 60/587,540, filed on Jul. 12, 2004.

(51) Int. Cl.
*B64D 39/00* (2006.01)
(52) U.S. Cl. .................................. 244/135 A
(58) Field of Classification Search ............... 244/1 TD, 244/135 R, 135 A
See application file for complete search history.

(56) References Cited

U.S. PATENT DOCUMENTS

| | | | |
|---|---|---|---|
| 2,582,609 A * | 1/1952 | Steele | 244/135 A |
| 4,072,283 A | 2/1978 | Welland | 244/135 |
| 5,499,784 A * | 3/1996 | Crabere et al. | 244/135 A |
| 5,785,276 A * | 7/1998 | Ruzicka | 244/135 A |
| 5,906,336 A * | 5/1999 | Eckstein | 244/135 A |
| 6,994,294 B2 * | 2/2006 | Saggio, III et al. | 244/135 A |
| 7,097,139 B2 * | 8/2006 | Schroeder | 244/135 A |

FOREIGN PATENT DOCUMENTS

GB    2237251 A  *  5/1991

* cited by examiner

*Primary Examiner*—Rob Swiatek
(74) *Attorney, Agent, or Firm*—Morgan, Lewis & Bockius LLP

(57) ABSTRACT

An autonomous in-flight refueling hose end unit includes a first end, a second end remote from the first end, one or more adjustable control surfaces and a flight control computer. The first end is configured to be coupled to a fuel hose of a tanker aircraft. The second end is configured to be coupled to receiver aircraft. The one or more adjustable control surfaces are adapted to fly the refueling hose end unit into contact with the receiver aircraft. The flight control computer autonomously controls the control surfaces to fly the refueling hose end into contact with the receiver aircraft. In some embodiments, the control interfaces include two wings or winglets and the second end includes a detachable boom or a detachable basket.

32 Claims, 3 Drawing Sheets

AUTONOMOUS IN-FLIGHT REFUELING SYSTEM

CROSS-REFERENCE TO RELATED APPLICATIONS

This application claims the benefit of U.S. Provisional Application Ser. No. 60/587,540 filed Jul. 12, 2004, which is hereby incorporated by reference for all purposes.

FIELD

This invention relates to a method and apparatus for refueling aircraft, and in particular for refueling aircraft during flight (in-flight).

DESCRIPTION OF RELATED ART

There are essentially two types of military in-flight refueling systems, namely: (1) the hose and drogue unit systems used by the U.S. Navy (USN) and foreign air forces; and (2) the boom and receptacle systems used by the U.S. Air Force (USAF). The two systems are generally incompatible with each other, i.e., a tanker aircraft from the U.S. Navy and foreign air forces cannot be used to refuel a USAF aircraft while a USAF tanker aircraft cannot be used to refuel a USN aircraft.

At the time of the Gulf War in the early 1990's, the inability to refuel USAF aircraft using a foreign tanker aircraft with a drogue system severely impacted inter-force operability. Existing drogues are usually funnel-shaped devices at the end of the hose of the tanker aircraft, used as a stabilizer and receptacle for the probe of receiver aircraft during in-flight refueling. From the early to mid 1990's, several studies were performed to evaluate fitting probes to USAF aircraft to overcome this problem. This proved to be very costly since there are about 25 times more receiver aircrafts than tanker aircrafts that would have to be modified.

Accordingly, it is highly desirable to provide an in-flight refueling system that allows receiver aircraft to be refueled by any type of tanker aircraft.

BRIEF SUMMARY OF THE INVENTION

According to the invention, a refueling hose end unit is provided. The refueling hose end unit includes a first end, a second end remote from the first end and one or more control surfaces. The first end is configured to be coupled to a fuel hose of a tanker aircraft. The second end is configured to be coupled to receiver aircraft. The one or more control surfaces are adapted to fly the second end of the refueling hose end unit into contact with the receiver aircraft. In some embodiments, the control surfaces include two adjustable wings or winglets. The second end includes a boom or a basket. A flight control computer is provided for autonomously flying the refueling hose end unit into contact with the receiver aircraft.

The refueling hose end unit of the present invention is configured to replace existing drogues, i.e., the refueling hose end unit attaches to the hose of a conventional hose/drum unit or pod-based hose of the tanker aircraft. This allows receiver aircraft to be refueled by a USN, foreign, or USAF tanker aircraft, without little, if any, modifications to the receiver aircraft.

BRIEF DESCRIPTION OF THE DRAWINGS

For a better understanding of the nature and objects of the invention, reference should be made to the following detailed description, taken in conjunction with the accompanying drawing, in which.

Like reference numerals refer to the same components throughout the figures.

DETAILED DESCRIPTION OF THE INVENTION

Figure 1:
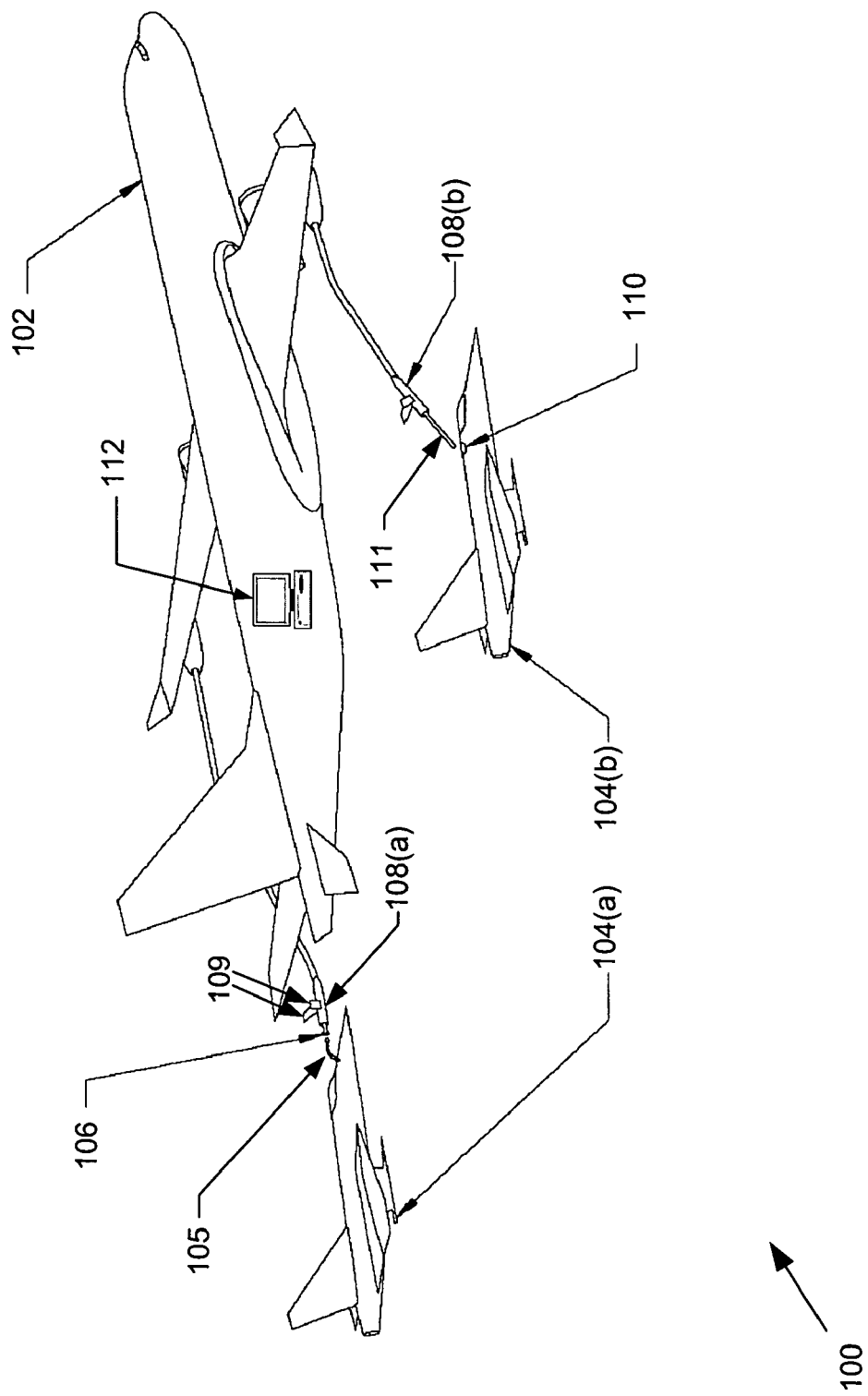
FIG. 1 is an isometric view of a system for in-flight refueling of receiver aircraft, according to an embodiment of the invention.

FIG. 1 is an isometric view of a system 100 for in-flight refueling of receiver aircraft. The system 100 includes a tanker aircraft 102 used for refueling receiver aircraft 104. The tanker aircraft 102 may be any suitable tanker, as is known to those of skill in the art. The receiver aircraft may be any suitable receiver aircraft. For example, FIG. 1 depicts two distinct receiver aircrafts 104(a) and 104(b). In some embodiments, the receiver aircraft 104(a) is configured to be refueled by a USN or foreign/international tanker aircraft. Such receiver aircraft includes a probe 105 for receiving a "basket" type drogue. In some embodiments, the receiver aircraft 104(b) is configured to be refueled by a USAF tanker aircraft. Such receiver aircraft includes a receptacle 110 for receiving a boom (or hose) from the tanker aircraft.

The present invention replaces both the "basket" type drogue and boom systems. As shown in FIG. 1, the "basket" drogue is replaced by a refueling hose end unit 108(a). The refueling hose end unit 108(a) is configured to be flown autonomously, i.e., with little, if any, human supervision, into contact with the probe 105 of the receiver aircraft 104(a). The autonomous flying hose end unit 108(a) incorporates one or more control surfaces, such as two adjustable small wings or winglets 109 that may be electro-mechanically operated. These winglets 109 may be disposed at a high dihedral angle. Rotation of these winglets is performed on an individual basis to provide both vertical and lateral flight control, i.e., pitch and roll. Additional surfaces may be provided to control yaw, such as a rotatable vertical tail fin. Longitudinal flight control (towards or away from the tanker aircraft) is achieved by active operation of a drum unit on the tanker aircraft 102, i.e., rolling and unrolling the drum unit to extend or retract the autonomous flying hose end unit 108(a) relative to the tanker aircraft 102. The autonomous flying hose end unit 108(a) may also include a short extension that extends from the tail end of the unit 108(a). The extension ends with a basket 106 that is configured to be received by a standard fuel probe 105 on the receiver aircraft 104(a). In another embodiment, the flying hose end unit 108(a) has a boom-style interface to mate with a standard USAF receiver aircraft receptacle on receiver aircraft.

In some embodiments, the winglets and the drum-extension position of the flying hose end unit 108(a) are controlled by an autonomous flight control computer 112. The autonomous flight control computer 112 may be installed inside the tanker aircraft 102 as shown in FIG. 1. Alternatively, the autonomous flight control computer 112 may be installed inside the flying hose end unit. In either case, the autonomous flight control computer 112 effectively "flies" the basket 106 of the flying hose end unit 108(a) into contact with the probe 105 on the receiver aircraft 104(a), thereby allowing refueling to take place after a predetermined level of contact is achieved.

The autonomous flight control computer 112 receives feedback information identifying the positions of the flying hose end unit 108(a) with respect to the tanker aircraft 102 and/or the receiver aircraft 104(a). In one embodiment, this feedback information is from a camera 222 and object recognition software mounted on the flying hose end unit 108(a). In this case, there is no need to modify any of the receiver aircraft. Alternatively, this feedback information is from a system that includes a signal source such as a small light-emitting diode (LED) recognition lamp added to the receiver aircraft and a light sensor 220 on the hose end unit 108(a). Clearly, this configuration requires at least the addition of a LED lamp to the receiver aircraft 104(a), which, in most cases, is a small and inexpensive modification.

Note that whenever it is required to refuel navy or foreign aircraft, the flying hose end unit 108(a) can be replaced by a traditional "basket" drogue using a quick-disconnect type interfacing attachment.

Similarly, for receptacle-style receiver aircraft such as those used by the USAF, an autonomous flying hose end unit 108(b) is provided. The autonomous flying hose end unit 108(b) is very similar to the autonomous flying hose end unit 108(a) except that it includes a short boom 111 that extends from the tail end thereof instead of an extension and a basket. The short boom 111 is configured to be received within a standard fuel receptacle 110 on receiver aircraft 104(b).

Figure 2:
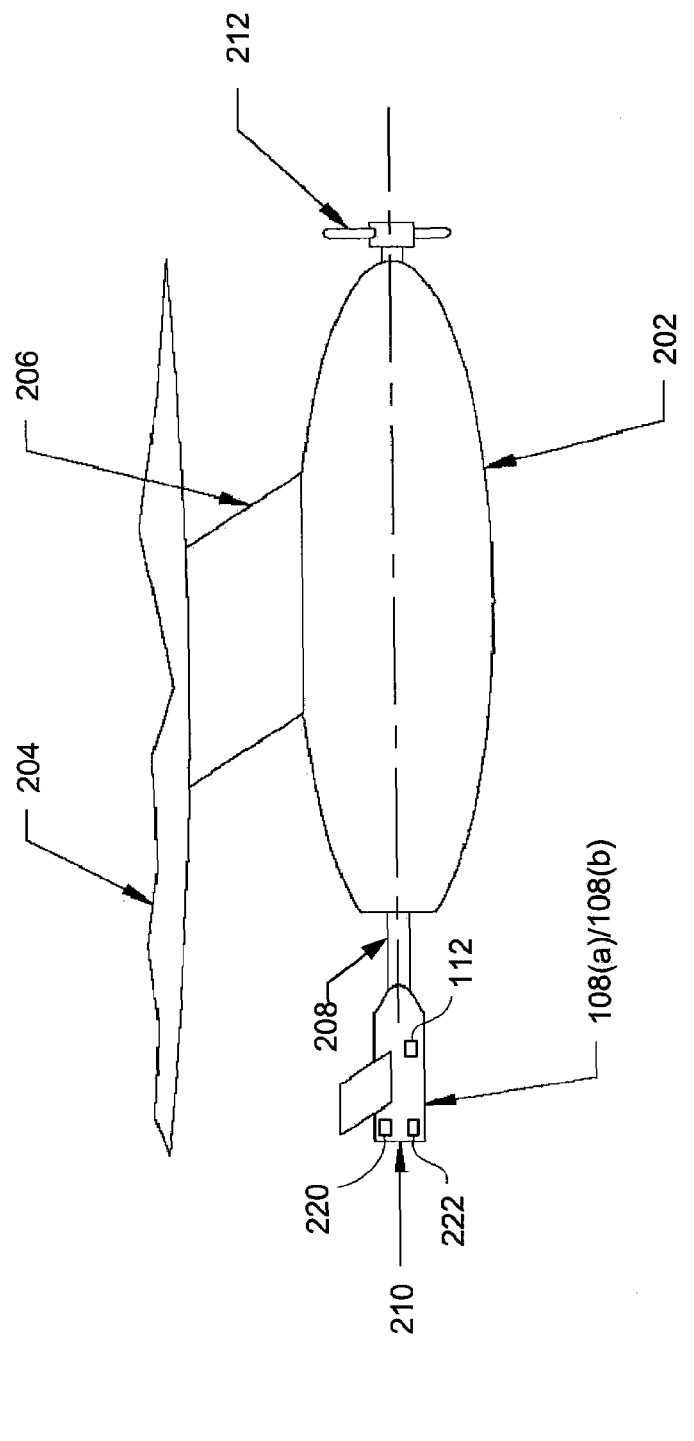
FIG. 2 is a side view of a flying hose end unit as attached to a tanker aircraft shown in FIG. 1, according to an embodiment of the invention.

FIG. 2 is a side view of the flying hose end unit 108(a) or 108(b) as attached to tanker aircraft 102 shown in FIG. 1. One or more under-wing refueling pods 202 are attached to the underside of one or both wings 204 of the tanker aircraft 102. Each pod 202 is attached to a wing 204 via a wing pylon 206. The autonomous flying hose end unit 108(a) or 108(b) is attached to the pod 202 via a retractable hose 208 that can be unreeled. The flying hose end unit 108(a) or 108(b) can be configured to serve USAF aircraft with a boom and a receptacle, or USN or foreign aircraft with a probe and a drogue. The flying hose end unit 108(a) or 108(b) may include a receiver connection 210 for removeably attaching a basket 106 or a short boom 111 to the flying hose end unit 108(a) or 108(b). In some embodiments, a ram-air turbine 212 is provided to generate power. For example, the turbine 212 may be used to power the drum that unreels the hose 208 and the flying hose end unit 108(a) or 108(b).

Figure 3:
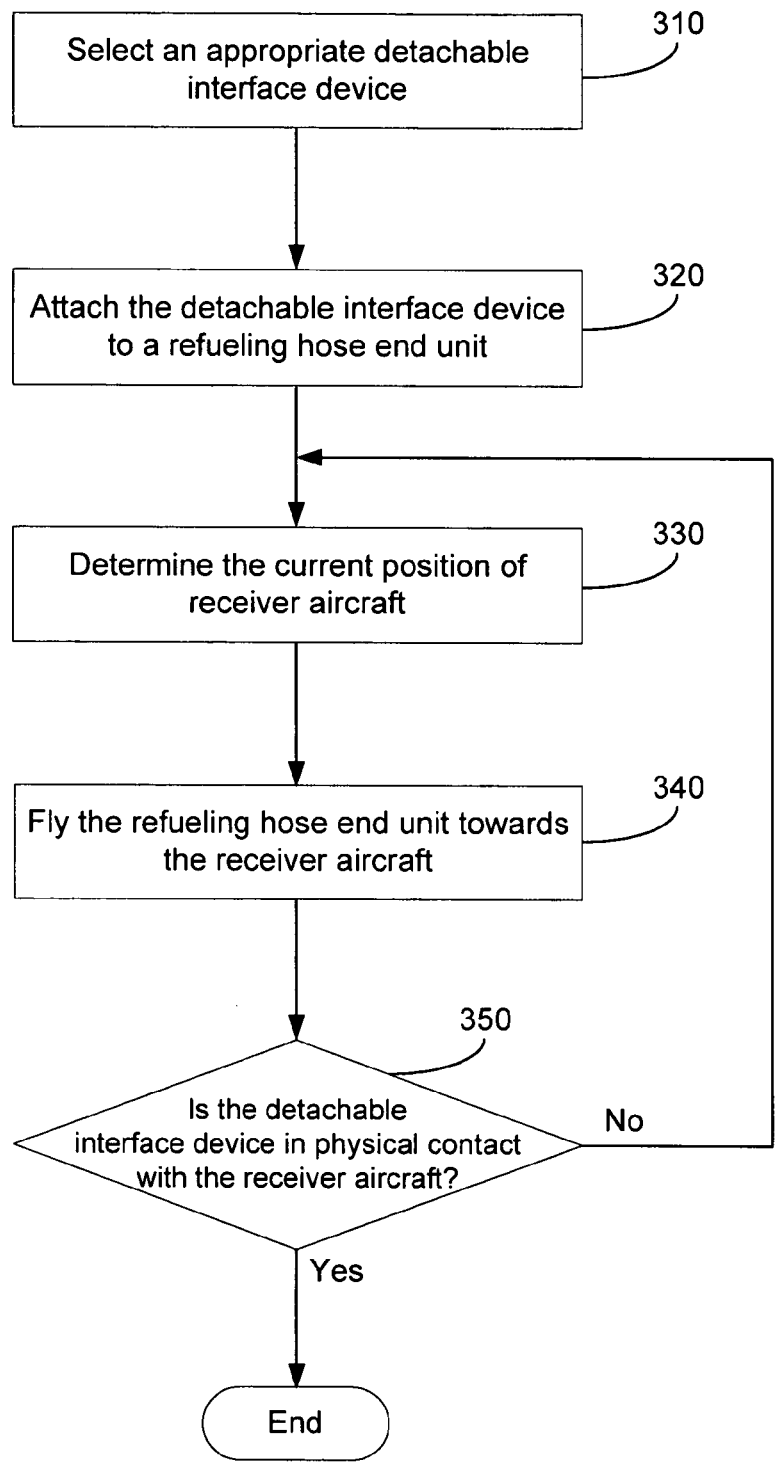
FIG. 3 is a flow chart of a method of connecting a tanker aircraft to an in-flight receiver aircraft, according to an embodiment of the invention.

FIG. 3 is a flow chart of a method of connecting a tanker aircraft to an in-flight receiver aircraft. First, an appropriate detachable interface device is selected in accordance with the receiver aircraft (310). In some embodiments, the detachable interface device is a detachable boom for USAF receiver aircraft or the like. This detachable boom is specially designed to mate with a standard receptacle on the receiver aircraft. In some other embodiments, the detachable interface device is a detachable basket for receiver aircraft associated with the U.S. Navy or foreign air forces. This detachable basket is specially designed to receive a standard fuel probe on the receiver aircraft.

In some embodiments, an instrument such as a camera 222 or a light sensor 220 is pre-installed on the flying hose end unit. This instrument is used for determining a current position of the receiver aircraft with respect to the refueling hose end unit (330). For example, the camera 222 first takes a picture of the receiver aircraft. The image of the receiver aircraft is transmitted to a flight control computer in the tanker aircraft through a wired or wireless communication channel. Object recognition software running in the computer processes the image to identify the receiver aircraft in the image and determined its current position based on the size and orientation of the receiver aircraft in the image. After determining the receiver aircraft's current position, the flight control computer generates instructions in accordance with the current position. These instructions are used against the control surfaces by, e.g., adjusting the winglets of the flying hose end unit and to autonomously fly the hose end unit into contact with the receiver aircraft (340).

In some embodiments, an instrument such as a camera or a light sensor is pre-installed on the flying hose end unit. This instrument is used for determining a current position of the receiver aircraft with respect to the refueling hose end unit (330). For example, the camera first takes a picture of the receiver aircraft. The image of the receiver aircraft is transmitted to a flight control computer in the tanker aircraft through a wired or wireless communication channel. Object recognition software running in the computer processes the image to identify the receiver aircraft in the image and determine its current position based on the size and orientation of the receiver aircraft in the image. After determining the receiver aircraft's current position, the flight control computer generates instructions in accordance with the current position. These instructions are used against the control surfaces by, e.g., adjusting the winglets of the flying hose end unit and to autonomously fly the hose end unit into contact with the receiver aircraft (340).

At a predetermined time interval, a new picture is taken of the receiver aircraft. The flight control computer processes this new image to check if the flying hose end unit is closer to the receiver aircraft, and then updates the current position of the receiver aircraft. The flight control computer uses this updated position to generate new instructions for the flying hose end unit until the flying hose end unit, or more specifically the detachable boom or basket, is in physical contact with the receiver aircraft (350, Yes). If not (350, No), this process is repeated until the condition is met and the end unit contacts the receiver aircraft.

Note that the whole process may be controlled by a specially designed software system running in the flight control computer. Under the guidance of the software system, the flying hose end unit flies autonomously towards the receiver aircraft without human intervention. In some embodiments, while the flying hose end unit actively approaches the receiver aircraft, the receiver aircraft may also actively approach the flying hose end unit.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described above in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A refueling hose end unit, comprising:
   a first end configured to be coupled to a fuel hose of a tanker aircraft;
   a second end having an interface, said interface configured to detachably couple with a boom, and said interface configured to detachably couple with a basket, wherein at least one of said boom or basket are configured to be detachably coupled to a receiver aircraft;
   one or more adjustable control surfaces configured to fly said refueling hose end unit into contact with said receiver aircraft; and
   a flight control computer within the refueling hose end unit, said flight control computer configured to autonomously control said control surfaces to fly said refueling hose end unit into contact with said receiver aircraft.

2. The refueling hose end unit of claim 1, wherein said control surfaces include two winglets coupled to said refueling hose end unit between said first and second end.

3. The refueling hose end unit of claim 2, wherein the two winglets have a predetermined dihedral angle.

4. The refueling hose end unit of claim 2, wherein a first of said two winglets is adapted by said flight control computer independently from a second of said two winglets.

5. The refueling hose end unit of claim 1, wherein said detachable basket is configured to be received by a standard fuel probe on the receiver aircraft.

6. The refueling hose end unit of claim 1, further comprising:
   a camera mounted on said refueling hose end unit, said camera configured to provide information for said flight control computer to determine a position of said refueling hose end unit with respect to said receiver aircraft.

7. The refueling hose end unit of claim 1, further comprising:
   a light sensor mounted on said refueling hose end unit, said light sensor configured to provide information about a signal source on said receiver aircraft for said flight control computer to determine a position of said refueling hose end unit with respect to said receiver aircraft.

8. A refueling hose end unit, comprising:
   a first end configured to be coupled to a fuel hose of a tanker aircraft;
   a second end having an interface configured to detachably couple with a boom that is configured to be detachably coupled to a standard fuel receptacle on the receiver aircraft;
   one or more adjustable control surfaces configured to fly said refueling hose end unit into contact with said receiver aircraft; and
   a flight control computer within the refueling hose end unit, said flight control computer configured to autonomously control said control surfaces to fly said refueling hose end unit into contact with said receiver aircraft.

9. A method of connecting a tanker aircraft to an in-flight receiver aircraft, comprising:
   selecting an appropriate detachable interface device in accordance with the receiver aircraft, wherein the interface device includes a boom and a basket, wherein at least one of said boom or basket are configured to be detachably coupled to the receiver aircraft;
   attaching the detachable interface device to a refueling hose end unit of the tanker aircraft;
   determining a current position of the receiver aircraft with respect to the refueling hose end unit;
   flying said refueling hose end unit towards said receiver aircraft based on said current position; and
   repeating said determining and flying steps until said refueling hose end unit is in physical contact with said receiver aircraft, wherein the determining and the flying is performed autonomously by the refueling hose end unit.

10. The method of claim 9, further comprising adjusting at least one control surface on said refueling hose end unit based on said current position.

11. The method of claim 9, wherein the selecting comprises:
    selecting a detachable boom in accordance with the receiver aircraft; and wherein the flying comprises:
    flying said detachable boom into contact with a standard fuel receptacle on the receiver aircraft.

12. The method of claim 9, wherein the selecting comprises:
    selecting a detachable basket in accordance with the receiver aircraft; and wherein the flying comprises:
    flying said detachable basket into contact with a standard fuel probe on the receiver aircraft.

13. The method of claim 9, further comprising:
    capturing a signal generated by a signal source on the receiver aircraft; and
    determining the current position of the receiver aircraft with respect to said refueling hose end unit based on the signal.

14. The method of claim 9, wherein said refueling hose end unit is autonomously flown towards said receiver aircraft by a flight control computer.

15. A tanker aircraft, comprising:
    at least one refueling pod attached to a tanker aircraft;
    at least one refueling hose end unit coupled to said at least one refueling pod via a retractable hose, said refueling hose end unit including:
    a first end configured to be coupled to the retractable hose;
    a second end having an interface, said interface configured to detachably couple with a boom, and said interface configured to detachably couple with a basket, wherein at least one of said boom or basket are configured to be coupled to a receiver aircraft;
    one or more adjustable control surfaces configured to fly said refueling hose end unit into contact with said receiver aircraft; and
    a flight control computer within the refueling hose end unit, said flight control computer configured to autonomously control said control surfaces to fly said refueling hose end unit into contact with said receiver aircraft.

16. The tanker aircraft of claim 15, wherein said control surfaces include two winglets coupled to said refueling hose end unit between said first and second end.

17. The tanker aircraft of claim 16, wherein the two winglets have a predetermined dihedral angle.

18. The tanker aircraft of claim 16, wherein a first of said two winglets is adapted by said flight control computer independently from a second of said two winglets.

19. The tanker aircraft of claim 15, wherein said basket is configured to be received by a standard fuel probe on the receiver aircraft.

20. The tanker aircraft of claim 15, further comprising:
    a camera mounted on said refueling hose end unit, said camera configured to provide information for said flight control computer to determine a position of said refueling hose end unit with respect to said receiver aircraft.

21. The tanker aircraft of claim 15, further comprising:
a light sensor mounted on said refueling hose end unit, said light sensor configured to provide information about a signal source on said receiver aircraft for said flight control computer to determine a position of said refueling hose end unit with respect to said receiver aircraft.

22. The tanker aircraft of claim 15, wherein said flight control computer is configured to control the retractable hose using a ram-air turbine.

23. A tanker aircraft, comprising:
at least one refueling pod attached to a tanker aircraft;
at least one refueling hose end unit coupled to said at least one refueling pod via a retractable hose, said refueling hose end unit including;
a first end coupled to the retractable hose;
a second end having an interface configured to detachably couple with a boom that is configured to be detachably and temporarily coupled to a standard fuel receptacle on the receiver aircraft;
one or more adjustable control surfaces configured to fly said refueling hose end unit into contact with said receiver aircraft; and
a flight control computer within the refueling hose end unit, said flight control computer configured to autonomously control said control surfaces to fly said refueling hose end unit into contact with said receiver aircraft.

24. A refueling hose end unit, comprising:
a first end configured to be coupled to a fuel hose of a tanker aircraft;
a second end detachably coupled to a detachable boom or a detachable basket that itself is configured to detachably and temporarily couple to a receiver aircraft; and
one or more adjustable control surfaces configured to fly said refueling hose end unit into contact with said receiver aircraft.

25. The refueling hose end unit of claim 24, wherein said control surfaces include two winglets coupled to said refueling hose end unit between said first and second end.

26. The refueling hose end unit of claim 25, wherein the two winglets have a predetermined dihedral angle.

27. The refueling hose end unit of claim 24, further comprising:
a flight control computer configured to control said control surfaces to autonomously fly said refueling hose end unit into contact with said receiver aircraft.

28. A refueling hose end unit, comprising:
a first end configured to be coupled to a fuel hose of a tanker aircraft;
a second end configured to be detachably and temporarily coupled to a receiver aircraft via an interface device that is detachably coupled to the second end, wherein said interface device is one of a detachable boom configured to be received by a standard fuel receptacle on the receiver aircraft and a detachable basket configured to be received by a standard fuel probe on the receiver aircraft; and
one or more adjustable control surfaces configured to fly said refueling hose end unit into contact with said receiver aircraft.

29. A refueling hose end unit, comprising:
a first end configured to be detachably coupled to a fuel hose of a tanker aircraft;
a second end detachably coupled to one of a detachable boom and a detachable basket both of which are configured to detachably and temporarily couple to a receiver aircraft; and
one or more adjustable control surfaces configured to fly said refueling hose end unit into contact with a receiver aircraft.

30. The refueling hose end unit of claim 29, wherein said control surfaces include two winglets coupled to said refueling hose end unit between said first and second end.

31. The refueling hose end unit of claim 30, wherein the two winglets have a predetermined dihedral angle.

32. The refueling hose end unit of claim 29, further comprising:
a flight control computer configured to control said control surfaces to autonomously fly said refueling hose end unit into contact with said receiver aircraft.

* * * * *